(12) United States Patent
Tudor

(10) Patent No.: US 11,353,409 B2
(45) Date of Patent: Jun. 7, 2022

(54) SYSTEM AND METHOD FOR THE NON-INTRUSIVE INSPECTION OF VESSELS

(71) Applicant: Mircea Tudor Scan Tech SA, Saint Imier (CH)

(72) Inventor: Mircea Tudor, Saint Imier (CH)

(73) Assignee: MIRCEA TUDOR SCAN TECH SA, Saint Imier (CH)

( * ) Notice: Subject to any disclaimer, the term of this patent is extended or adjusted under 35 U.S.C. 154(b) by 88 days.

(21) Appl. No.: 16/629,078

(22) PCT Filed: May 3, 2018

(86) PCT No.: PCT/CH2018/050014
§ 371 (c)(1),
(2) Date: Jan. 7, 2020

(87) PCT Pub. No.: WO2018/205042
PCT Pub. Date: Nov. 15, 2018

(65) Prior Publication Data
US 2020/0200689 A1   Jun. 25, 2020

(30) Foreign Application Priority Data
May 8, 2017  (CH) .............................. CH 00612/17

(51) Int. Cl.
*G01N 23/04* (2018.01)
*G01V 5/00* (2006.01)

(52) U.S. Cl.
CPC ........... *G01N 23/04* (2013.01); *G01V 5/0066* (2013.01); *G01N 2223/631* (2013.01)

(58) Field of Classification Search
CPC ............. G01N 23/04; G01N 2223/631; G01V 5/0066; G01V 5/0016; G01V 5/0025
See application file for complete search history.

(56) References Cited

U.S. PATENT DOCUMENTS

| 6,658,087 B2 * | 12/2003 | Chalmers | G01V 5/0025 |
| | | | 378/86 |
| 7,209,540 B2 * | 4/2007 | Muhanna | G01V 5/0016 |
| | | | 378/57 |
| 8,855,268 B1 | 7/2014 | Safai et al. | |

FOREIGN PATENT DOCUMENTS

| CN | 101183082 B * | 8/2011 | |
| KR | 101120955 B1 * | 3/2012 | G01V 5/005 |

(Continued)

OTHER PUBLICATIONS

International Search Report issued in connection with PCT Application No. PCT/CH2018/050014 dated Nov. 19, 2018.

*Primary Examiner* — Christine S. Kim
(74) *Attorney, Agent, or Firm* — Steven M. Shape; Dennemeyer & Associates, LLC

(57) ABSTRACT

The present invention consists of a system and a method for a rapid, complete and nonintrusive inspection of vessels without their physical control.

The nonintrusive control method, in accordance with the invention, consists in the relative movement of a vessel, through two scanning frames, in a manner synchronized with the triggering of two penetrating radiation generators and the transmission of the signals generated by the detector matrix towards the subsystem for the acquisition, processing and display of data in order to form and display radiographic images from at least two different perspectives of the scanned vessel.

The scanning system, according to the invention, consists of a support-type mechanical structure, a control center, two scanning frames, two penetrating radiation sources, a vessel towing subsystem, a subsystem for vessel stabilization and a subsystem for the acquisition, processing and display of data.

7 Claims, 4 Drawing Sheets

(56) References Cited

FOREIGN PATENT DOCUMENTS

RO 129601 * 6/2014
WO 2016036264 A1 3/2016

* cited by examiner

SYSTEM AND METHOD FOR THE NON-INTRUSIVE INSPECTION OF VESSELS

BACKGROUND

The present invention is a system and method for the rapid, complete and non-intrusive inspection of vessels using the penetrating radiation. The inspection is carried out without the direct intervention of the human factor on the inspected vessel, thus eliminating time-consuming activities such as physical control by customs or security officers.

With the present invention, radiographic images of the inspected vessel and the goods loaded in the vessel are obtained, images on the basis of which an operator evaluates the shape, quantity and nature of the goods and objects present in the scanned vessel. The system obtains radiographic images of the inspected vessel from two different perspectives, one substantially vertical and one substantially horizontal, also obtaining in this manner information relating to the precise positioning in space of the objects of interest, or of the analyzed areas of interest.

In the practical application, by the analysis of the radiographic images obtained by the system of the present invention, are detected smuggling attempts, illegal transport of prohibited or undeclared products (drugs, explosives, weapons, large sums of money, money in cash, etc.) using vessels as an international means of transport.

At present, we know several systems and methods for the partial or total scanning of vessels with penetrating radiation.

One of these non-destructive testing systems is described in the patent "Nautical X-ray Inspection System" (U.S. Pat. No. 6,658,087) using the principle of the reflected radiographic scanner (backscatter) and having the disadvantage of generating a radiograph with useful information only from the first few centimeters of the vessel that is exposed to the radiation detectors. By using such a system, an operator cannot identify any object or person who is not in the immediate vicinity of the vessel bulkheads, thus having a very limited utility. Unlike this non-intrusive control system, the system claimed by the present invention can identify threats or smuggling items found in any point of the vessel and in addition, the system is capable to spatially identify the threat or contraband element, the operator being able to apply the intrusive control directly to the area where the threat or contraband element is identified.

Another patent of invention "Vessel Scanning System" (U.S. Pat. No. 7,209,540) describes a system using the principle of the penetrating radiation scanner, the patent proposes the use of a system of removal of water in the direction of scanner, using elastic objects made of low-density materials or filled with air. This method has the disadvantage of lacking the ability to remove water in a predictable manner, since the objects which must remove the water will deform randomly to the passing of a vessel and for this reason a lot of water will penetrate the area crossed by the penetrating radiation, water preventing the realization of a precise radiography. The present invention has the advantage of eliminating pitching movements by partially lifting the floating equilibrium vessel using two supports mounted on the scanning frame and equipped with wheels on which moves the vessel that will be inspected. In addition, by using this stabilization system of the vessel that will be inspected the amount of water between the vessel and the penetrating radiation detector matrix is minimized to a maximum, the attenuation of the penetrating radiation being insignificant in the scanning process.

Another system presented in an invention patent application "Device and method for non-invasive detection of hazardous materials in the aquatic environment" (PCT/PL2015/050021) proposes to detect the presence of hazardous materials in the interior of the vessel by using a fast neutron generator and the detection of specific alpha and gamma radiation emitted by certain materials of interest. A disadvantage of this system is it cannot be involved for transport with organic material, particularly because fast neutron pulses can generate transmutations of matter that can be dangerous for the lives of men and animals. In addition, this system does not solve the technical problem proposed by the present invention, since it does not generate a radiographic image of the inspected vessels.

The technical problem solved by the present invention is the rapid, non-intrusive and complete inspection of vessels in support of a system for inspecting vessels with a high inspection capacity, making at least two complete radiographic images of the vessel from different angles, while the vessel is towed through the scanning frames with a towing device that is part of the system.

The operating principle of the system involves the irradiation of two or more detector matrix, typically one located under the keel of the vessel and the second located on a substantially vertical support. The electrical signals provided by the detectors are processed in an analog/digital way in order to generate a radiography, which will be displayed on the monitor of a workstation. The capture and processing of the signals supplied from a large number of detectors, usually a few thousand, involve complex electronic blocks and a network of cables with a large number of parallel connections between this arm and the subsystems generating the radiographed image.

The system for the complete and non-intrusive inspection of vessels in accordance with the present invention consists of a mechanical support structure, in the shape of a metal boom placed in console, located firmly on a dock; the structure on which a first penetrating radiation generator is installed, situated over the area on which the vessels that are to be scanned are towed; a second penetrating radiation generator located at the bottom of the same mechanical support structure, a first radiation detector frame immersed under the body of the vessel, centered with the first penetrating radiation generator, with which we determine the scanning frame used to obtain a radiographic image of the vessel inspected by a substantially vertical projection; a second radiation detector frame, centered with the second penetrating radiation generator, determining the scanning frame used to obtain a radiographic image of the inspected vessel by a substantially horizontal projection; a computing system for acquiring, processing and displaying the data provided by the radiation detector matrix and for controlling the scanning process, as well as a vessel towing subsystem for the vessels which will be inspected radiographically during their passage through the two scanning frames.

The scanning frame that generates a substantially vertical projection (above view) is composed of a mechanical support structure formed of one or more segments, being coupled at one end to the dock of the port, having mounted on the other end a penetrating radiation generator which, in the scanning configuration is positioned above the inspected vessel, so that the beam of penetrating radiation emitted by the penetrating radiation generator is directed towards the water, in a substantially vertical plane—and in a matrix of radiation detectors mounted underwater, positioned under the inspected vessel, so that the detectors are oriented towards the beam of the penetrating radiation source and on which the inspected vessel moves with constant speed, being towed by the vessel towing subsystem.

The scanning frame that generates a substantially horizontal projection (side view) is composed of another matrix of radiation detectors and which in the scanning process has a substantially vertical position, laterally of the inspected vessel and a penetrating radiation generator placed on the same mechanical support structure next to the inspected vessel, so that its beam of radiation is being oriented towards the respective matrix of detectors.

In order to carry out the radiography, the vessel towing device tows the inspected vessel through the two scanning frames, the movement being synchronized with the start of the penetrating radiation generators and the data acquisition from the radiation detectors, in order to obtain at least two radiographic images of the vessel, from different angles.

The scanning system is also equipped with a subsystem for monitoring the position of the scanned vessel relative to the scanning frames, containing at least one proximity sensor which detects the presence of the vessel in the proximity of the first scanning frame, in the direction of movement of the vessel and which is used to automatically trigger the emission of radiation at the beginning of the scanning operation and respectively to stop the emission of radiation at the end of the scanning operation of the vessel.

A horizontal detection ensemble formed of several identical detector matrix aligned, one in line with the other is located below the water level, in the passing zone of the vessel and is mounted in a perfectly watertight casing consisting of at least two articulated segments, with a degree of freedom and an angular actuation system, allowing to optimize the approach of the detection ensemble to the immersed part of the vessel, by modifying the angles between the segments of the detection ensemble, so that it follows as faithfully and dynamically the section profile of the bottom of the inspected vessel. Since it is known that water attenuates the penetrating radiation, in order to obtain a good quality radiographic image, the detection ensemble is equipped with an actuation system allowing the variation of the angular position between the segments of the ensemble, as well as the submerging depth of the detector ensemble, to the purpose of approaching the bottom of the vessel, so that between the detector matrix and the profile of the vessel remains a minimum distance, and implicitly, a minimal quantity of water as absorbing element, disruptive of the radiographed image. For the automatic determination of the angle described by the articulated segments of the submersible detector ensemble and the distance from the detection ensemble to the profiled bottom of the vessel, the system is provided with a profiling subsystem of the bottom of the vessel in three dimensions, located in parallel to the ensemble segmented by the detectors, in front of it in the direction of movement of the vessel, subsystem generating a three-dimensional computer model of the bottom profile of the vessel, according to which the detection unit is automatically and continuously adjusted during the passing of the vessel over the detection unit, by changing the angle between the segments of the ensemble of detectors and the distance to the body of the vessel. The penetrating radiation generator which forms with the detector ensemble, the scanning frame for a substantially vertical projection, is positioned on the console-type mechanical support structure in a movable mounting, allowing the modification of the height at which the generator of radiation is located, in order to adapt the vessel scanning system to various heights, and also to synchronize its position with the set of detectors located underwater, in order to maintain a relatively constant distance between the two elements.

A vertical detection ensemble consisting of several identical detector matrix aligned, one in line with the other, is situated next to the vessel passing zone, partially immersed in the water and partially above the water, opposite to the penetrating radiation generator, with which forms the scanning frame for the substantially horizontal projection. The vertical detection unit is located on a dock or on a floating structure and is provided with a system for the modification of the position that automatically moves horizontally and vertically, depending on the draft, the width and height of the vessel, to optimize the substantially horizontal projection by the complete comprehension of the vessel in projection and to reduce the distance between the set of vertical detectors and the body of the vessel and implicitly the amount of water between the vertical detection unit and the vessel, in order to minimize the radiation absorption as much as possible, in order to optimize the quality of the radiographed images. The penetrating radiation generator which together with the detection ensemble forms the scanning frame for the substantially horizontal projection, is positioned on the console-type mechanical support structure, with a movable mounting allowing the modification of the horizontal and also the vertical position, in order to synchronize its position with the vertical detection ensemble found on the opposite side of the vessel, thus framed between the two penetrating radiation generators and the two sets of detectors, to maintain a relatively constant distance between the detectors and the penetrating radiation generators.

The non-intrusive control method, in accordance with the invention, removes the disadvantages of the prior systems by the fact that the towing device is coupled to the vessel which will be inspected, being towed through the two scanning frames, synchronized with the start of the two penetrating radiation generators, and respectively with the transmission of the signals of the detector matrix to the subsystem for the acquisition, processing, generating and displaying of the radiographed images.

In order to scan, the vessel is towed through the two scanning frames with a constant speed, speed that is chosen according to the type of the vessel and the declared load, the speed being measured by a speed measuring system located on the towing device. The subsystem monitoring the position of the vessel scanned with respect to the scanning frames contains at least one proximity sensor which detects the presence of the vessel in the vicinity of the first scanning frame in the direction of travel of the vessel and determines the start of the penetrating radiation generators.

The scanner is stopped automatically in the following cases: when the scanned vessel has passed entirely through the two scanning frames, in the case of intruders in the scanning dock, at the triggering of a sensor which transmits a signal when the vessel does not follow the pre-established travel trajectory, or when the vessel is dangerously approaching any component of the scanning system, on detection of the dangerous increase or decrease in the speed of travel. The termination of the scanning process can be controlled manually by the operator at any point in the scanning process. During the passage through the scanning frames, the resulting images after the scanning of the inspected vessel are displayed on the operator's monitor, concomitantly, proportionally and in a manner synchronized with the displacement of the vessel.

By implementing the invention the following advantages are obtained:

The inspection of a large number of vessels in a short period of time (up to 30 per hour);

The complete inspection of the vessel, including the area below the water level, and also the compartments and constructive cavities of the vessel, being known the fact that for reasons of safety and buoyancy, the vessels have a series of cavities that are theoretically sealed, and which are not being accessible for inspection, that can be used to hide contraband goods;

Achieving a complete image of the scanned vessel by viewing the radiographed image from two different perspectives, top view and side view, because of the two penetrating radiation generators located above and on the side the vessel and two sets of detectors placed in the opposite direction on the other side of the vessel;

Prevent unfavorable cases from obtaining inconclusive radiographies, generated by unfavorable positions of the elements tracked to be discovered, by simultaneously generating two views from different perspectives, only one of which may be unfavorable;

Eliminate the risk of professional irradiation of the operators and also the risk of accidental irradiation of potential intruders in the scanning dock;

Using operating personnel limited to one person per shift;

Mobility, flexibility et maneuverability of the system;

High degree of automation;

Increased productivity, increased number of vessels inspected per unit of time, by the automation of the processes and reducing dead time through computerized process management.

BRIEF DESCRIPTION OF THE DRAWINGS

Further, an example of implementing the invention is presented in connection with the figures from 1 to 4 that describe.

DETAILED DESCRIPTION OF THE DRAWINGS

Figure 1:
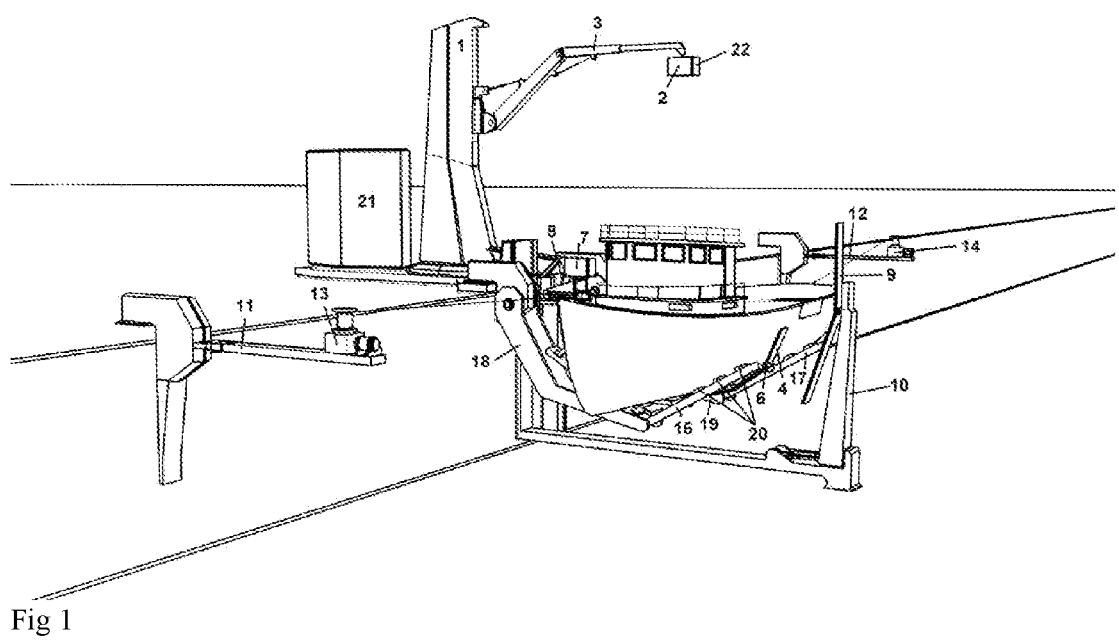
FIG. 1: perspective view of the non-intrusive inspection system.
Figure 2:
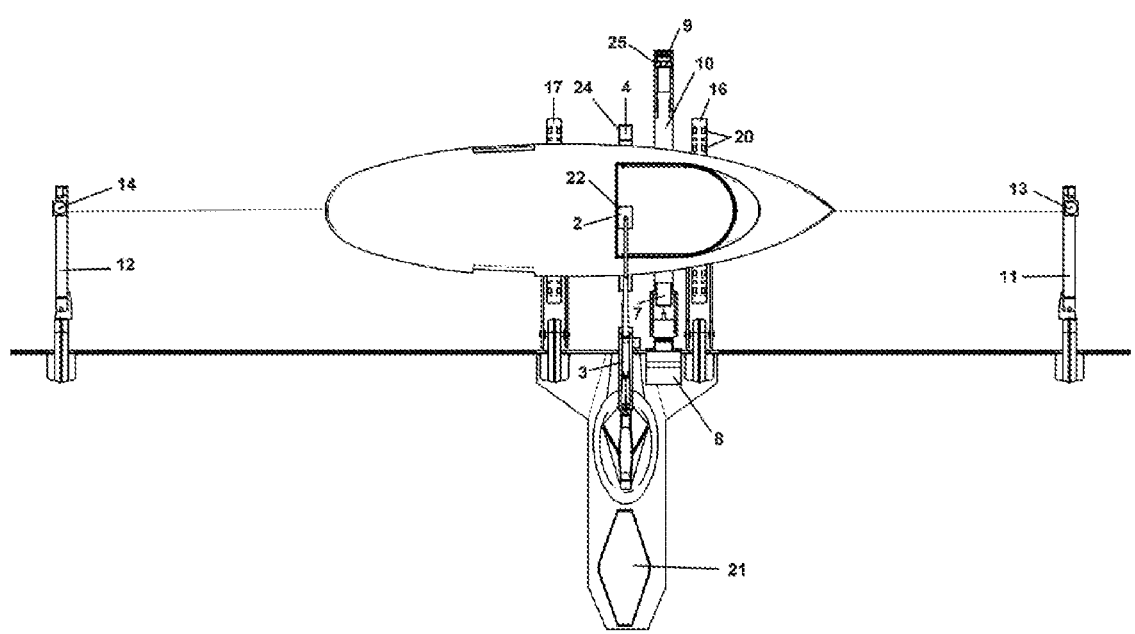
FIG. 2: top view of the non-intrusive inspection system.
Figure 3:
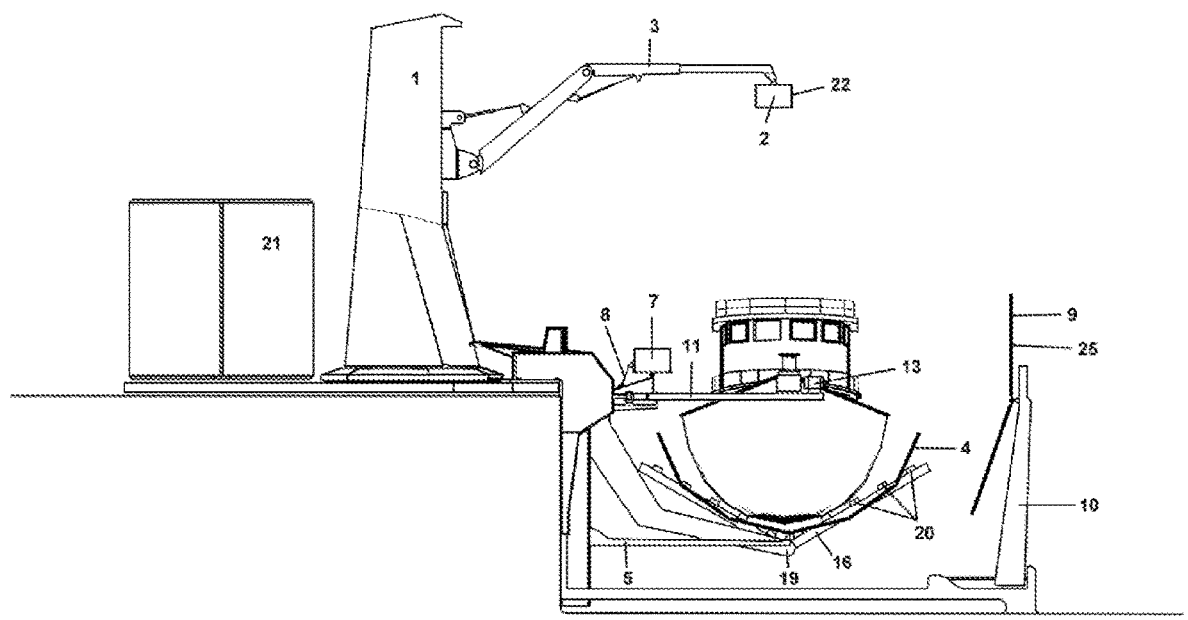
FIG. 3: front view of the non-intrusive inspection system.
Figure 4:
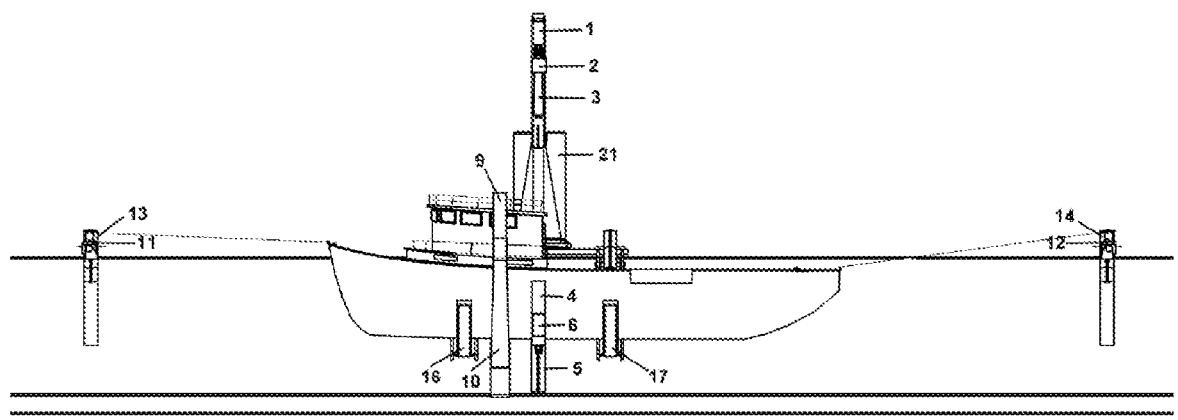
FIG. 4: side view of the non-intrusive inspection system.

In an implementing variant, the vessel non-intrusive inspection system, according to the invention, is composed of a console-type mechanical support structure 1 installed on a dock, structure on which is installed a first penetrating radiation generator 2 fixed on a multi-articulated support arm 3 over the area through which vessels pass, a multi-articulated support arm 3 ensuring the modification of the position of the generator 2 both vertically and horizontally, so that it forms with the multi-articulated detection ensemble 4, placed under the water-level on a multi-articulated arm 5 mounted jointly on the resistance structure of the dock and ensuring the modification of the position of the multi-articulated detection ensemble 4, both vertically and horizontally, so that it forms a first scanning frame in order to obtain a radiographic image of the inspected vessel by a substantially vertical projection. The multi-articulated detection ensemble 4 is composed of at least six segments actuated by an actuating system 6 which modifies the geometric shape of the multi-articulated detection ensemble 4 so that it follows the longitudinal profile and section profile of the submerged body of the vessel that is to be inspected, to minimize the distance and implicitly the amount of water between the detection ensemble and the body of the inspected vessel. Mounted on the same console-type mechanical support structure 1, beyond the latter, is provided a second penetrating radiation generator 7, mounted on a support 8, ensuring the modification of the position of the penetrating radiation generator 7, both vertically and horizontally, so that it forms with the articulated detection ensemble 9, mounted on an arm 10, ensuring the modification of the position of the articulated detection ensemble 9, both vertically and horizontally, so that the penetrating radiation generator 7 and the articulated detection ensemble 9 forms a second scanning frame in order to obtain a radiographic image of the inspected vessel by a substantially horizontal projection. In order to carry out the scanning process, a towing subsystem T for the vessels is provided, subsystem consisting of two supports 11 and 12 mounted on the dock on one side and on the other by the two scanning frames, at a distance of at least two lengths of the vessel of the type of vessel that has to be inspected. Support 11 is equipped with a winch 13 and support 12 is also equipped with a winch 14. Winch 13 connects to one side of the inspected vessel, and winch 14 connects to the opposite side of the inspected vessel to ensure towing through the two scanning frames in both directions. The use of the two opposite winches ensures the stability of the speed of movement, the maintaining of an axial rectilinear trajectory parallel to the dock and the obtaining of radiographed images with minimal geometric distortions.

To ensure the clarity of the image, the system may be equipped with a stabilization subsystem 15 of the vessel towards the two scanning frames, consisting of two supports 16 and 17 in the form of the letter "V", placed under water-level on two articulate arms 18 and 19, arms allowing the variation of the position of the supports 16 and 17 vertically, so that they partially remove the vessel from its floating balance, enough to eliminate the pitching movements induced by the waves that may be present in the scanning area. To allow the displacement of the vessel with reduced force on the supports 16 and 17, they are equipped with rollers 20.

After the connection of a vessel to the towing system T, the scanning procedure can be carried out by initiating the command of the control interface from a control center 21, when the winch 13, being connected from the bow of the vessel begins the towing through the scanning frames, the first frame being delimited by the multi-articulated detection ensemble 4 placed under the water level and the penetrating radiations generator 2, supported on the multi-articulated support arm 3, found on the console-type mechanical support structure 1, and the second scanning frame being delimited by the articulated detection ensemble 9, mounted on the arm 10 and the penetrating radiation generator 7. The system is also equipped with a position monitoring subsystem of the scanned vessel, containing at least one proximity sensor 22, which detects the presence of the vessel in the vicinity of the scanning frames and which is used to automatically start the emission of radiation at the beginning of the scanning and respectively to stop the emission of the radiation at the end of the vessel scanning.

In order to realize a complex radiographic image, the system is equipped with a subsystem 23 for the acquisition, processing and display of data, using the data provided by the detector matrix 24 mounted in the multi-articulated detection ensemble 4 and by the detector matrix 25 mounted in the articulated detection ensemble 9, matrix receiving the radiation generated by the generators 2 and 7, radiation that went through the inspected vessel; the subsystem performs the control of the scanning process by controlling the towing of the vessel, by controlling the towing speed, and also by starting and stopping the penetrating radiation generators.

The scanning process can be stopped automatically when the inspected vessel goes completely through the two scanning frames, when it dangerously approaches any component of the scanning system, when intruders breach into the scanning dock, on detection of a dangerous increase or decrease in the towing speed of the vessel, during this phase the images resulting after the scanning of the vessel are being displayed on the monitor of the operator, at the same time being created and archived a real file of the scanning process, and at the end of the scanning phase, the penetrating radiation generators 2 and 7 are automatically stopped, the perimeter protection of the scanning dock is automatically disabled, the vessel winches 13 and 14 are detached, after which the vessel can leave the area, and the scanning cycle can be resumed.

The invention claimed is:

1. A non-intrusive inspection system for a vessel comprising:
   a console-type mechanical support structure (1) located on a dock;
   a command center (21) which is positioned with respect to the dock;
   a first penetrating radiation generator (2) mounted on a free end of a multi-articulated support arm (3) having several segments positioned above an area through which the vessel is towed for inspection, where the first penetrating radiation generator (2) is configured to emit a beam of radiation towards the water in a substantially vertical plane;
   a multi-articulated detection ensemble (4) mounted below a water level, the multi-articulated detection ensemble (4) having a first matrix of detectors (24) aligned with the beam of radiation from the first penetrating radiation generator (2) and mounted on a multi-articulated arm (5) positioned under the vessel when the vessel is in the area through which the vessel is being towed;
   where the first penetrating radiation generator and the multi-articulated detection ensemble form a first scanning frame through which a radiographic image is generated when the radiation beam from the first penetrating radiation generator is detected by the detectors on the multi-articulated detection ensemble;
   a second penetrating radiation generator (7) positioned next to the vessel being inspected and configured to generate a beam of radiation towards the vessel being inspected;
   an articulated detection ensemble (9) mounted on an arm (10) and having a second detector matrix (25), the articulated detection ensemble (9) being positioned vertically in a variable angle next to and on a side opposite the vessel being inspected;
   where the second penetrating radiation generator (7) and the articulated detection ensemble (9) form a second scanning frame through which a radiographic image is generated when the radiation beam from the second penetrating radiation generator is detected by the detectors on the articulated detection ensemble (9);
   a subsystem (23) configured to acquire, process, and display data provided by the multi-articulated detection ensemble and the articulated detection ensemble and to control a scanning process, where a vessel towing subsystem (T) tows the vessel being inspected through the first scanning frame and the second scanning frame, where the vessel moves in synchronization with a triggering of the first and second penetrating radiation generators and the detection of the radiographic image by the first detector matrix (24) and the second detector matrix (25) to obtain the radiographic images; and
   a stabilization subsystem (15) configured to partially remove the vessel from a floating balance sufficient to eliminate a pitching motion caused by waves present within the first and second scanning frames.

2. The non-intrusive inspection system of claim 1, wherein the multi-articulated support arm (3) is configured to control a position of the first penetrating radiation generator (2) both vertically and horizontally, and to form, with the multi-articulated detection ensemble arm (4), the first scanning frame to obtain the radiographic image of the vessel from a substantially vertical projection.

3. The non-intrusive inspection system of claim 1, wherein the multi-articulated arm (5) positions the multi-articulated detection ensemble (4), vertically and horizontally to form, with the penetrating radiation generator (2), the first scanning frame to obtain the radiographic image of the vessel from a substantially vertical projection.

4. The non-intrusive inspection system of claim 1, wherein the multi-articulated detection ensemble (4) is formed of at least six segments connected by articulations with one degree of freedom, where an actuating system (6) rotationally moves and modifies a geometric shape of the multi-articulated detection ensemble (4) to dynamically follow a longitudinal profile and a sectional profile of a submerged portion of the vessel to be inspected.

5. The non-intrusive inspection system of claim 1, including a support (8) configured to position the second penetrating radiation generator (7) vertically and horizontally to form, with the second articulated detection ensemble (9), the second scanning frame to obtain the radiographic image of the vessel from a substantially horizontal projection.

6. The non-intrusive inspection system of claim 1, wherein the arm (10) positions the articulated detection ensemble (9) both vertically and horizontally, to form, with the second penetrating radiation generator (7), the second scanning frame to obtain the radiographic image of the vessel from a substantially horizontal projection.

7. The non-intrusive inspection system of claim 1, wherein the articulated detection ensemble (9) includes two segments connected by an articulation with one degree of freedom to provide a rotational movement of one segment so as to decrease a distance between the detector matrix (25) and a keel of the vessel.

* * * * *